US006404325B1

(12) United States Patent
Heinrich et al.

(10) Patent No.: US 6,404,325 B1
(45) Date of Patent: Jun. 11, 2002

(54) METHOD AND SYSTEM FOR STORAGE AND RECOVERY OF VITAL INFORMATION ON RADIO FREQUENCY TRANSPONDERS

(75) Inventors: Harley Kent Heinrich; Daniel J. Friedman, both of Tarrytown, NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/330,786

(22) Filed: Jun. 11, 1999

Related U.S. Application Data

(63) Continuation-in-part of application No. 09/227,649, filed on Jan. 8, 1999, now abandoned.
(60) Provisional application No. 60/070,758, filed on Jan. 8, 1998.

(51) Int. Cl.[7] ................................................ H04Q 1/00
(52) U.S. Cl. ..................................... 340/10.34; 340/636
(58) Field of Search ............................. 340/10.34, 636, 340/10.1

(56) References Cited

U.S. PATENT DOCUMENTS

| 5,489,908 A | | 2/1996 | Orthmann et al. |
| 5,515,053 A | | 5/1996 | Hecht et al. |
| 5,517,194 A | * | 5/1996 | Carroll ..................... 340/10.34 |
| 5,521,602 A | * | 5/1996 | Carroll ..................... 340/10.34 |
| 5,525,992 A | | 6/1996 | Froschermeier |
| 5,528,221 A | | 6/1996 | Jeuch et al. |
| 5,537,105 A | | 7/1996 | Marsh et al. |
| 5,602,538 A | | 2/1997 | Orthmann et al. |
| 5,686,902 A | | 11/1997 | Reis et al. |
| 5,712,630 A | * | 1/1998 | Nanboku ................. 340/10.34 |
| 5,850,181 A | | 12/1998 | Heinrich et al. |
| 6,157,321 A | * | 12/2000 | Ricci .......................... 340/10.1 |
| 6,204,765 B1 | * | 3/2001 | Brady ..................... 340/10.34 |

* cited by examiner

Primary Examiner—Brian A Zimmerman

(57) ABSTRACT

The present invention assures the integrity of state information retained by a Radio Frequency Transponder during a loss of power. During the regular operation of the Transponder power is provided to a voltage-storing device powering an information retention mechanism of the Transponder. After the loss and reestablishing of power to the Transponder but before the Transponder is restarted, the voltage-storing device is checked to determine whether sufficient power is present in the information retention mechanism to retain information without corruption. If sufficient power is present, a signal to indicate that fact is communicated to the Transponder and the stored information is restored. The Transponder is then restarted.

17 Claims, 2 Drawing Sheets

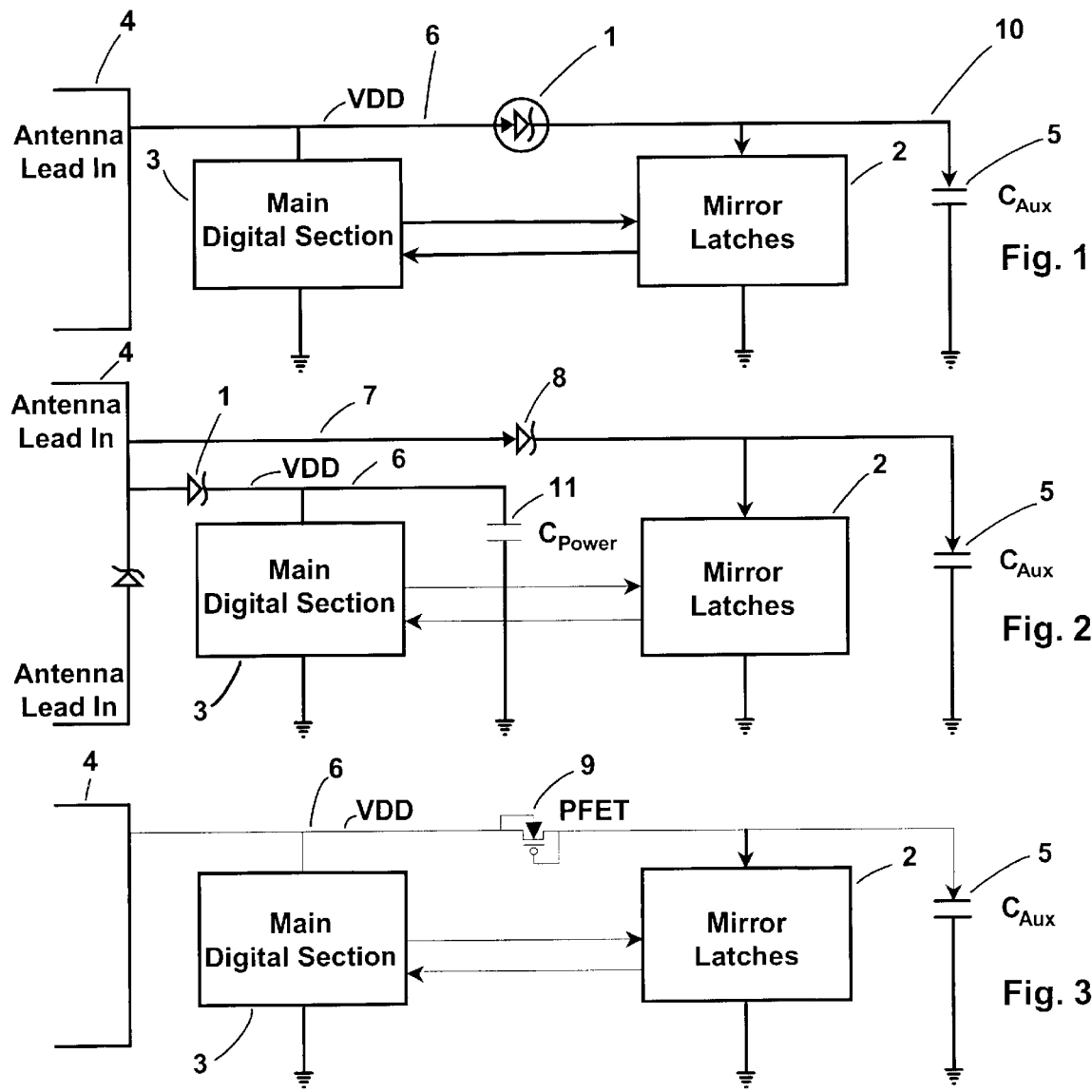

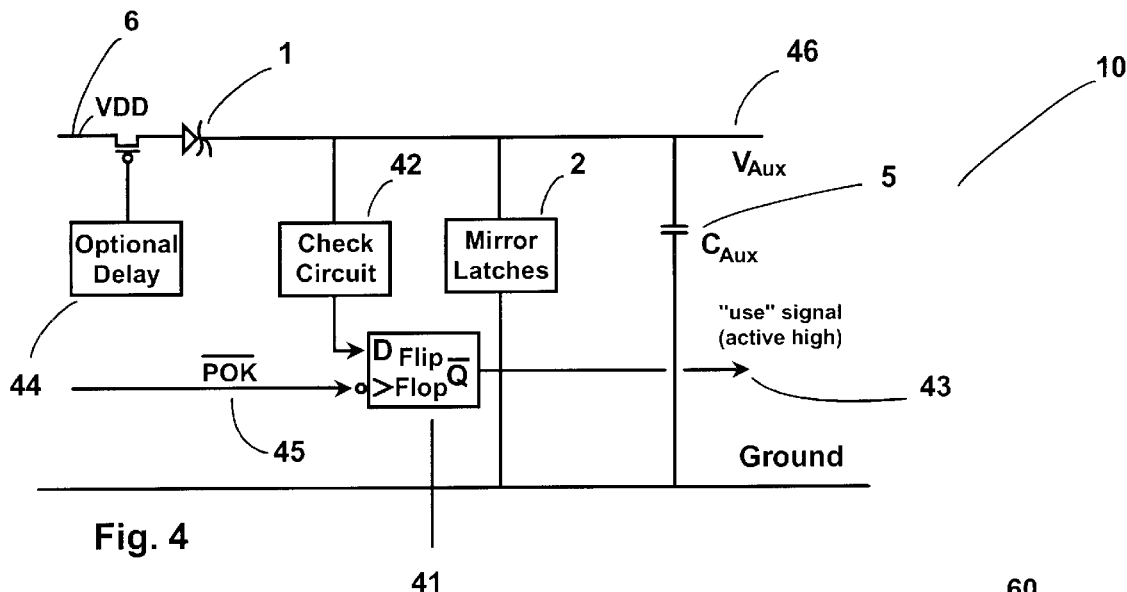
Fig. 4
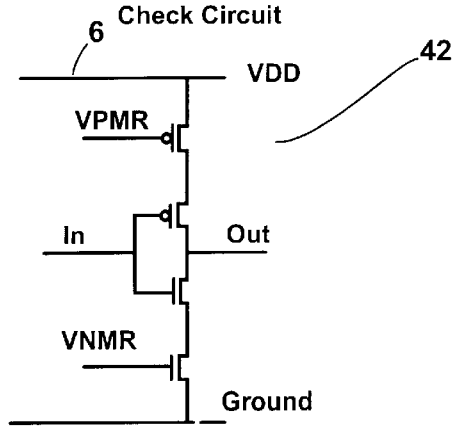
Fig. 5
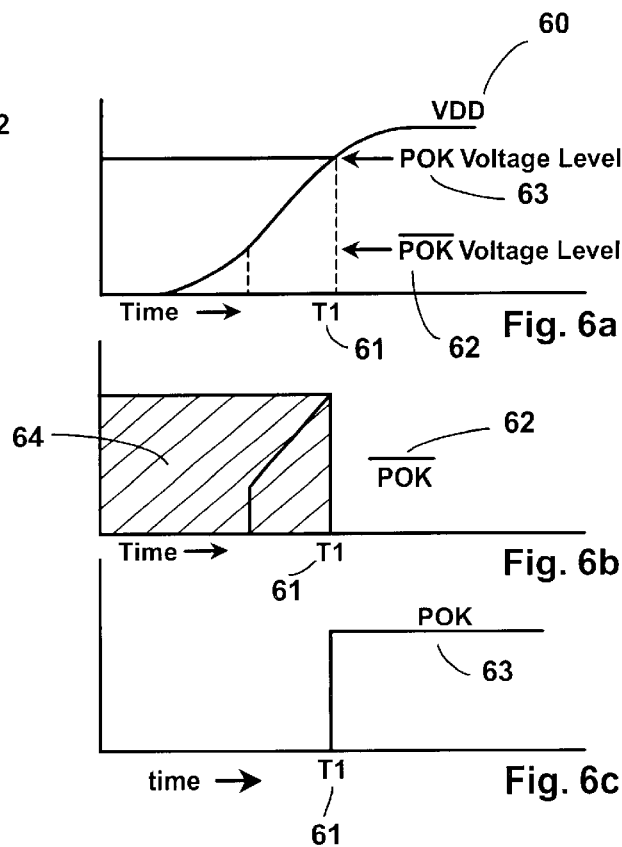
Fig. 6a
Fig. 6b
Fig. 6c

METHOD AND SYSTEM FOR STORAGE AND RECOVERY OF VITAL INFORMATION ON RADIO FREQUENCY TRANSPONDERS

CONTINUATION IN PART APPLICATION

The following patent application is a Continuation In Part application based on and claims the benefit of U.S. patent application Ser. No. 09/227,649 now abandoned, filed Jan. 8, 1999 and Provisional Patent Application Serial No. 60/070,758, filed Jan. 8, 1998, the contents of both are incorporated herein by reference.

BACKGROUND OF THE INVENTION

1. Field of the Invention

The invention relates to the field of Radio Frequency Transponders and more specifically to retaining and restoring of valid state information by the Radio Frequency Transponders upon the reapplication of power.

2. Description of the Background of the Invention

Radio Frequency (RF) Transponders (tags) are used in a multiplicity of ways. They may be used in locating and identifying accompanying objects, as well as for transmitting information about the state of an object. It has been known since the early 60's that electronic components of transponders could be powered by a sequence of periodic signal bursts sent by a "base station" and received by a tag antenna on each of the transponders.

The RF electromagnetic field induces an alternating current in the transponder antenna that can be rectified by a RF diode of the transponder, and the rectified current can be used for a power supply for the electronic components of the transponder. The current induced in the transponder antenna from the incoming RF energy would thus be changed, and the change in the alternating current changes or modulates the RF power radiated from the transponder antenna back to the base station. This change in the radiated power from the transponder antenna is picked up by the base station antenna. Thus, the transponder antenna broadcasts a return signal without itself having a self contained power supply.

The "rebroadcast" of the incoming RF energy is conventionally called "back scattering", even though the transponder broadcasts the energy in a pattern determined solely by the transponder antenna. Since this type of transponder carries no power supply of its own, it is called a "passive" transponder to distinguish it from a transponder containing a battery or other energy supply, conventionally called an active transponder.

As an example, consider an RF tag designed to respond equally well to signals at frequencies ranging from 2.425 GHz to 2.475 GHz in an ideal environment. In a less then ideal environment, where there are other RF tags, metal objects, water-filled objects, etc. disposed in close proximity to a particular RF tag that is attempting to communicate with the base station, the RF energy available at a particular frequency to be received by the particular RF tag may be attenuated. This situation is analogous to repositioning a TV or a radio antenna to get the strongest reception. Similar to the effect of the person repositioning the antenna on the reception of the antenna, the presence of other tags and/or objects interferes with the RF reception of a particular tag. Additionally to comply with the FCC regulations, the carrier frequency used by the base station hops over relatively narrow channels of up to 1 MHz wide in the allowed band, e.g., 2.400 to 2.483 GHz in the 2.450 GHz case, during communication.

When an array of tags is being interrogated by a base station, it is possible for very different field strengths to be available to tags depending on the carrier frequency of that channel being used by the base station at the time of the communication and on the different positions of tags in the array. For instance, a first tag at a first position may be well powered when the base station operates at 2.422 and 2.463 GHz but not at 2.447 GHz, while a second tag at a second different position may be well-powered when the base station operates at 2.463 GHz and 2.447 GHz, but not 2.422 GHz. These differences are related not to the RF tag design but to the instantaneous RF environment of the individual RF tag at the time the interrogation by the base station occurs.

If power being supplied to the RF tag has been removed for even short time duration, the state information being maintained or stored by the RF tag is lost. For example, when the RF burst powering the RF tag falls off, the tag power, which for passive tags is maintained by a storage capacitor, may be lost in as little as 100 microseconds. The state information of the RF tag is then also lost.

Losing the state information of the RF tag is particularly injurious when a base station sending a polarized RF is interrogating an array of RF tags having antennas polarized in different manners. When some RF tags may not be powered up by a particular frequency used, the communication protocol will attempt to talk to each tag in the array.

RF tags may have major and minor states. The major states may include the "ID," "READY," and "DATA-EXCHANGE" states. Each RF tag identifies itself to the base station in the "ID" state, lets the base station know that it is ready to transfer data in the "READY" state, and sends data in the "DATA-EXCHANGE" state. The minor states include information such as the counter value used during the identification protocol initiated from the base station.

When a RF signal burst of a first frequency is sent from the base station to an array of RF tags, some of RF tags in the array do receive sufficient power to operate from that signal burst and will proceed to operate through the stages or states of operation, such as entering the "READY" or "DATA-EXCHANGE" states. The RF tag is typically operated cyclically through those states; in each cycle the states are carried out in the order set out above. Thus if the base station knows in which state a particular tag is operating, it has an effective "book ark" as to where in the cycle this particular tag is operating. When the RF environment changes or when the base station hops to new carrier frequency, some of the tags that were previously powered, will not now receive sufficient power and will no longer be able to operate. At the same time, other RF tags in the array that previously had insufficient power to operate will now become powered up by the RF burst of the new frequency and start working.

An illustrative cycle of operation of the array of ten RF tags may be described as follows:

1. The base station or the reader is on channel one and RF tags 1–8 respond by beginning their participation in the identification protocol. All eight tags are successfully identified.
2. The reader now hops to channel two, the frequency of channel 2 allows tags 7–9 to be powered. Tag 9 will now respond by beginning participation in the identification protocol, while tags 1–6 lose their power and therefore stop participating. Since tags 7 and 8 were already identified and continue to be powered sufficiently when operating on channel, they do not participate in the protocol.

3. The reader hops to channel 3. The frequency of channel 3 allows tags 2–10 to be powered. Tags 7–9 stay powered and do not participate in the protocol. However, tags 2–6 must be reidentified in order to identify the one truly new tag 10.

The RF tags that are not well powered lose track of state information. This state information is essentially a bookmark in the communication sequence between the tag and the base station. In running an ID protocol, for example, tags that newly enter the field as well as tags that have lost power and then regained it while remaining in the field are treated equally; they both have to be identified from scratch, wasting time. If state information could be maintained, the tags that remain in the field and are not powered sufficiently even only for brief periods of time would not have to reenter the protocol and thus system level performance with regard to tag identification would be improved.

SUMMARY OF THE INVENTION

What is needed is for the state information of each RF tag to be maintained in order to prevent that RF tag from participating in the protocol with the base station, in identifying previously unidentified tags of a tag array therefore improving system performance.

The present invention assures the integrity of state information retained by the RF tags during a loss of power. At the time of the regular operation of each RF tag, the power is provided to a voltage-storing device, such as a capacitor, powering an information retention mechanism of the RF tag. The power source for that voltage storing device may be directed through a device such as a diode or a PFET, which may be dedicated or shared with other components of the RF tag.

After the loss and reestablishing of power to the transponder but before the transponder restarts, the transponder checks the voltage-storing device powering the information retention mechanism to determine whether sufficient power is present to retain information without corruption. Additionally, after the power is restored, the delaying circuitry of the transponder may delay the restart to assure proper determination of whether sufficient power is present. If sufficient power is present, the transponder communicates a signal to indicate that fact, the stored information is restored and the transponder restarts.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 1 is a block diagram showing an exemplary Radio Frequency Transponder circuitry for retaining state information during a period when power is not supplied to the transponder.

FIG. 2 is a block diagram showing an alternative Radio Frequency Transponder circuitry where separate power sources are provided to power the circuitry and to charge a capacitor for information retention.

FIG. 3 is a block diagram showing an alternative Radio Frequency Transponder circuitry where a PFET transistor is used.

FIG. 4 is a block diagram showing a Radio Frequency Transponder circuitry where voltage across a capacitor is measured to determine the state of retained information.

FIG. 5 is a block diagram showing an exemplary voltage check circuitry, which may be used by the present invention.

FIGS. 6a–c are time/voltage diagrams showing good and bad power levels.

DETAILED DESCRIPTION OF THE INVENTION

FIG. 1 of the present invention shows a RF tag 10 comprised of a diode 1, such as a Schottky or another type of diode, for accepting power from the main power line 6. The main power line 6 powers both, a main digital section 3 of the RF tag 10 and a capacitor $C_{AUX}$ 5. The power accepted by the diode 1 is generated by the RF tag antenna 4 in conjunction with a well known power receiving circuit (not shown) when RF energy is received from a base station.

The capacitor $C_{AUX}$ is charged to a sufficient voltage to power a mirror latches mechanism 2 which may hold copies of state information of the RF tag 10. At any time during the operation of the RF tag 10, the processing of the main digital section 3 may place or save relevant information in to the mirror latches mechanism 6. This capacitor $C_{AUX}$ is provided as a power source for the mirror latch mechanism 2 to enable it to retain the essential state indicators during the interval when the power supply to the RF tag is interrupted, for example the base station hops to a new frequency. The power from the capacitor $C_{AUX}$ is provided to only a few transistors of the RF tag 10 and is not used to power up the clock or other RF tag 10 electronics. Therefore, the amount of required energy is small and may be provided by a relatively small capacitor. Furthermore, when the power is restored or reapplied and the RF tag 10 restarts, the information retained in the mirror latches mechanism 2 may be read back into the main digital section 3 to be used in the subsequent operation of RF tag 10 operation.

The information to be retained or saved may include both, the major and the minor state indicators. Some minor state information, such as the address from which the base station attempted to access data when the power is removed, need not be saved and may be allowed to be lost with little impact on the communication protocol initiated by the base station. That is because the whole command including the address must be re-sent by the base station.

FIG. 2 shows another embodiment of the present invention. In this embodiment, the power line 7 for the mirror latches mechanism 2 is independent. The capacitor $C_{AUX}$ is connected directly to the antenna-lead-in 4 and may illustratively use a Schottky diode 8 to rectify the RF energy received by the antenna which is not shown in the figure.

In yet another embodiment shown in FIG. 3, a PFET transistor 9 may be used instead of the diode 1 (FIG. 1). The supply of voltage $V_{DD}$ 6 may vary very slowly, so that the transistor 9 may effectively rectify voltage for charging the capacitor $C_{AUX}$.

Turning back to FIG. 1, please note that the size of the capacitor $C_{AUX}$ and the leakage current therefrom determines the time interval during which the mirror latches mechanism 2 will store a copy of the state information. When the power sent to the RF tag 10 from the antenna 4 is too low, the voltage $V_{DD}$ 6 may fall below a threshold value sufficient to energize the RF tag electronics reliably. In such a situation, a power-no-good signal (POK_), as shown in FIGS. 6a–c is issued by a separate RF tag circuitry to prevent the RF tag 10 from any further processing. Nevertheless, the mirror latches mechanism 2 will maintain the copy of the state information, for a period time initiated when the RF tag is powered up and continuing as long as it takes for the leakage current to drain the capacitor $C_{AUX}$ 5 through the mirror latches mechanism 2. Please note that when a RF signal burst of a different or second frequency is sent from the base station, other RF tags 10 in the array will be powered up. Each RF tag may be energized by the RF signal bursts of different frequencies see the example described in the Background of the invention section. Hence, some RF tags from a first set may be powered up, by the RF signal bursts of frequencies other then the first frequency and will attempt to change their state.

As explained, the inventive RF tag 10 is constructed to retain the state information that was stored in the mirror latches mechanism 2 during a first application of the RF signal burst at a frequency suitable to power up that RF tag 10. The RF tag 10 will be powered until the base station performs a frequency hop to a frequency, which may or may not be suitable to power this particular RF tag 10 depending upon the RF environment of the tag array. The state information stored in the mirror latches mechanism 2 is retained until the base station, at a later time, reapplies the RF signal burst suitable to re-power up the RF tag 10 to the set threshold level. When the RF tag 10 is re-powered, it is permitted to down load and use the state information retained in the mirror latches mechanism 2. So, when the RF tag 10 is re-powered, the state information maintained in the mirror latches mechanism 2 is read and used to reset the states of the RF tag 10. However before the state information is used, the voltage across $C_{AUX}$ must be checked to ascertain that it has not fallen to a threshold level where the information maintained in the mirror latches 2 is no longer trustworthy.

FIG. 4 shows a power-no-good signal 45 applied as an input to a flip flop circuit 41, another input to that flip flop circuit 41 being the output of a check circuit 42. When the power-no-good signal 45 falls while the $V_{DD}$ on line 6 is sufficient to power the RF tag 40, the check circuit 42 determines if the voltage $V_{AUX}$ across the capacitor $C_{AUX}$ 5 is high enough with respect to the value of the voltage $V_{DD}$. Thereby if the determined voltage is high enough, a signal 43 is outputted to permit the use of the information stored in the mirror latches 2. If on the other hand, the voltage level of the capacitor $C_{AUX}$ is determined to be less then the threshold, the integrity of the information contained in the mirror latches mechanism 2 is considered suspect and is not used. An example of a check circuit 42 for checking the voltage $V_{AUX}$ across the capacitor $C_{AUX}$ is shown in FIG. 5.

FIG. 6a shows the voltage $V_{DD}$ as a function of time during the energizing of the RF tag by a single burst of RF energy. When the RF burst is broadcast to the RF tag 10 (FIG. 4), the power supply $V_{DD}$ (FIG. 4) starts to charge the capacitor $C_{AUX}$ (FIG. 4). At time $T_1$ the voltage may charge the capacitor $C_{power}$ (FIG. 2) to a sufficiently high voltage to render the RF tag 10 operative, and the power-no-good signal POK_ will be removed. This signal POK_ is issued in the region 64 shown in FIG. 6b. to tell the electronic components of the RF tag 40 (FIG. 4) that there is insufficient power for reliable operation. When $V_{DD}$ reaches the threshold level for stable operation at $T_1$, the power-no-good signal POK_ falls and a power-good signal POK comes on as shown in FIG. 6c.

Returning now to FIG. 4, the power-no-good POK_ signal 45 is used to prevent $C_{AUX}$ from charging when the voltage $V_{DD}$ on line 6 is falling after the power burst has been applied and when the voltage $V_{DD}$ on line 6 is increasing as represented by region 64 (FIG. 6b). When the power-no-good signal POK_45 falls at $T_1$ (FIG. 6a), the transistor 1 is rendered conductive to apply current to recharge $C_{AUX}$. Furthermore, to assure that the voltage $V_{AUX}$ 46 across the capacitor $C_{AUX}$ is not changing while the decision is being made as to whether to use the information in the mirror latches mechanism 2 powered by the capacitor $C_{AUX}$, an optional delay circuit 44 may be used to assure that the period allocated to decision making is long enough.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for assuring integrity of information in a Radio Frequency transponder, said information being retained during a period when no power is supplied to said transponder, the method comprising the steps of:
   (a) applying power to said transponder;
   (b) after removal of the power applied to said transponder, utilizing stored energy from the applied power to retain the information during the period when no power is applied to said transponder; and
   (c) making use of the retained information only if it is determined that the store energy remained adequate to retain said information without corruption.

2. The method of claim 1, wherein the information is stored in an auxiliary volatile storage and is transferred to a different section of the transponder if the stored energy remained adequate, when power is again applied to said transponder.

3. The method of claim 1, wherein power is applied to the transponder at intervals such that the stored energy should remain adequate to retain said information, for the time intervals between successive applications of power, when a multitag identification operation is being carried out including said transponder.

4. The method of claim 2, wherein the energy required to retain information in the auxiliary volatile storage is stored in an auxiliary charge storage device which does not supply energy to the different section of the transponder.

5. The method of claim 2, wherein the energy required to retain information in the auxiliary volatile storage is stored in an auxiliary charge storage which substantially only supplies energy to said auxiliary volatile storage.

6. The method of claim 3, wherein the stored energy becomes inadequate if the time interval between successive applications of power substantially exceeds the time intervals between supply of RF power during the multitag identification operation, whereupon the information is not transferred to the different section of the transponder when power is next applied.

7. A method of effecting identification operation with a plurality of RF tags, comprising the steps of:
   (a) applying RF power to said plurality of RF tags whereby at least one of said plurality of RF tags receives enough of said RF power to become activated;
   (b) communicating with an activated RF tag to establish new state information; said activated RF tag utilizing stored energy to maintain the new state information in a volatile memory for a preset time interval after the RF power is removed; and
   (c) re-applying said RF power to said plurality of RF tags before the end of the preset time interval whereby the new state information tends to be retained during the identification operation.

8. A passive RF tag comprising:
(a) a tag antenna for receiving RF power and modulated RF information signals sent to said RF tag by a base station;
(b) a first tag voltage rectification circuit coupled to said tag antenna for receiving said RF power from said tag antenna and for providing power to the electronic components of said RF tag, said electronic components receiving said power only from said first tag voltage rectification circuit;
(c) a main memory;
(d) a volatile auxiliary memory for storing state information in the absence of a received RF power signal, and
(e) an auxiliary power capacitor for storing energy while the antenna is receiving RF power, for energizing said volatile auxiliary memory, where said auxiliary power capacitor retains sufficient energy to power said volatile auxiliary memory so as to retain the stored state information for a first period of time after said RF power to said RF tag is removed.

9. The passive RF tag of claim 8, further comprising a second tag voltage rectification circuit coupled to said tag antenna for receiving said RF power from said tag antenna, said electronic components receiving said power only from said first tag voltage rectification circuit, and said auxiliary capacitor receiving power only from said second tag voltage rectification circuit.

10. The passive RF tag of claim 9, wherein said second tag voltage rectification circuit comprises a PFET transistor.

11. The passive RF tag of claim 8, further comprising a check circuit for checking power on said auxiliary power capacitor to determine if the state information has been reliably retained after said RF power is removed.

12. The passive RF tag of claim 11, further comprising a delay circuit for delaying a start of operation of said RF tag after said RF power is received.

13. The passive RF tag of claim 11, further comprising a decision circuit for sending a signal indicating that state information retained in said volatile auxiliary memory is not corrupted, said decision circuit accepting as an input a signal from said check circuit and a signal from a circuit which determines whether power being received by said RF tag is sufficient.

14. The passive RF tag of claim 8, wherein there is provided a first power check circuit for determining whether the voltage on said auxiliary power capacitor is above a predetermined level to generate a first signal and, if not, a second signal.

15. The passive RF tag of claim 14, wherein there is included a switch that is responsive to said first signal to apply power to said auxiliary power capacitor.

16. The passive RF tag of claim 15, wherein there is included a logic circuit that is responsive to the presence of signals comprising said first signal to permit state data to be transferred from said auxiliary memory to said main memory.

17. A method of effecting a multi-tag identification operation, comprising the steps of:
(a) providing RF energy to a plurality of RF tags disposed in a field region thereof to activate at least one of said plurality of RF tags, wherein at least said one RF tag includes a power storage device, a volatile information retaining device, and a check device;
(b) determining whether there is sufficient power in said power storage device by utilizing said check device and indicating whether information retained in said information retaining device is valid;
(c) supplying energy to said power storage device, whereby said power storage device can power said volatile information retaining device for a time interval when said one RF tag is de-activated; and
(d) Using said retained state information if information retained in said volatile information retaining device is indicated to be valid.

* * * * *